Nov. 7, 1933.  W. B. SLEMMER  1,934,646
CEMENT HANDLING APPARATUS
Filed Oct. 21, 1931   2 Sheets-Sheet 2

Inventor
William B. Slemmer,
By William W. Deane
his Attorney

Patented Nov. 7, 1933

1,934,646

UNITED STATES PATENT OFFICE 1,934,646

CEMENT HANDLING APPARATUS

William B. Slemmer, Malden, Mass., assignor to Warren Brothers Company, Cambridge, Mass., a corporation of West Virginia Application October 21, 1931. Serial No. 570,250

1 Claims. (Cl. 221—118)

This invention is directed to an improvement in apparatus for accurately controlling the delivery of finely-divided material, as cement, from a bulk source to the weighing apparatus without possibility of permitting any excess or deficient delivery.

In the proportioning of Portland cement for use in mixtures in road work and other purposes, it is usual to measure the cement and other ingredients in proper proportions by weight to insure that in the mixing preparatory to use, each batch will contain its required amount of aggregate and cement. This proportioning of the materials of the particular load at a central plant is quite usual, and in the handling of the cement from the bulk source to the weighing machine, such conventional devices usually employ a worm conveyor or feeder, or a conveyor of other type, by which the cement is delivered from the bulk source to the weighing machine. Such conveyors are usually automatically or manually controlled to cut off the cement at a predetermined delivery to the weighing machine, but practice proves that the cement, or any fine mineral dust being handled, particularly if more or less aerated, maintains its motion following the interruption of the conveyor, with a consequent delivery to the weighing machine of an excess amount of material. This is objectionable, in not only delivering an undue proportion of the cement or like material, but causes a monetary loss in that more material is delivered than is being paid for in the particular mixture.

The primary object of the present invention is the provision of means for handling cement intermediate the bulk source and the weighing machine, to insure an absolutely accurate and certain cut off of the cement delivered at the proper moment, with the absolute certainty that no further delivery to the weighing machine can occur, and hence the selected and proportional amount of cement delivered is absolutely and correctly maintained under all conditions.

The same arrangements that prevent over-weight, will also prevent underweight, as the construction eliminates the necessity for the operator anticipating the approach of the scale indicator to the cutting-off point, as has always been necessary in previously-used, manually-operated apparatus.

A further object of the invention is the provision of means by which the cement is delivered from the bulk source to the feeding conveyor by a rotary feeder, the operation of which is interrupted when the actual delivery of the cement beyond the conveyor to the weighing machine is cut off. Thus the liability of under-run or over-run is prevented by a positive cut-off beyond the conveyor and by the interruption of the feeding of the amount from the bulk source to the conveyor, as any amount in this manner can be accurately weighed.

A further object of the present invention is the provision of means for simultaneously and similarly controlling the feeder intermediate the bulk source and conveyor, for controlling the conveyor, and for controlling the cut-off between the conveyor and weighing machine, whereby all elements tending to advance the cement from the bulk source to the weighing machine are simultaneously and similarly interrupted.

The invention is illustrated in the accompanying drawings, in which:—

The apparatus includes a hopper 1, to which the cement is delivered in bulk in any approved or appropriate manner, it being understood that the part here indicated as a hopper is intended to represent the bulk source, and that the use of the word hopper hereinafter is intended to cover any and all means for delivering the material from any storage supply to the feeder.

Figure 1:
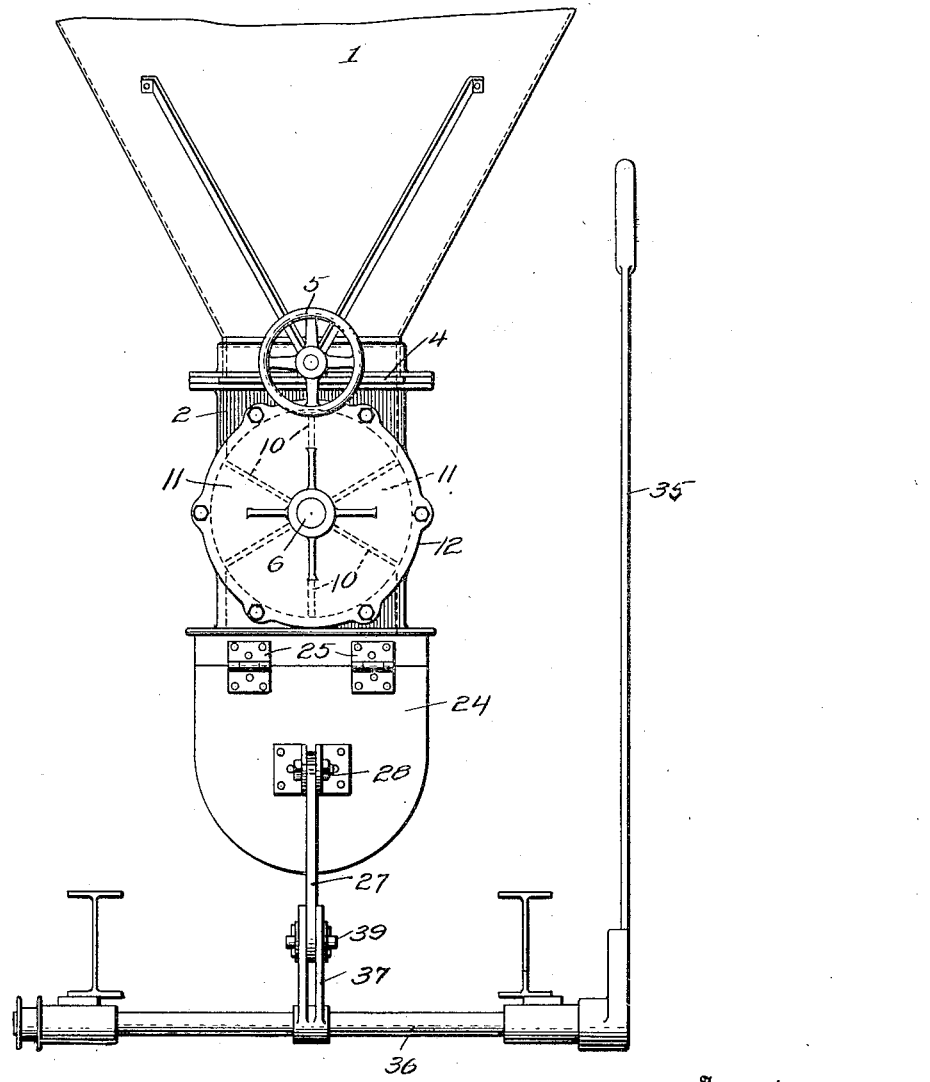
Fig. 1 is a view in end elevation showing the improved apparatus.

The lower discharge end of the hopper communicates through a shell 2 with a conveyor casing 3, arranged at right angles to the shell and in open communication with the latter. A conventional cut-off 4 is arranged in the upper end of the shell 2, and is controlled through the medium of a hand wheel 5, provision being thus made for delivering the cement from the hopper to the shell. A shaft 6 extends through the center line of the shell below the cut-off 4, the shaft being mounted in appropriate bearing supports 7 on the outer side of the shell. Mounted on the shaft and fixed with relation thereto, is a feeding element 8, including a hub 9, fixed to the shaft, and radiating wings 10, defining a series of independent pockets 11. The sheel 2, throughout the range of the feeding element 8 is given a cylindrical form, as indicated at 12 in Fig. 1, to thereby provide for the effective rotation of the wings 10, and to insure that said wings directly interrupt free passage through the shell 2.

A conveyor shaft 13 is mounted longitudinally of the conveyor casing 3, and carries within the casing a suitable conveyor, here shown as a spiral blade 14, operating to feed the cement longitudinally of the casing 3. The shaft 13, which is supported in a bearing 15 secured to the closed end 16 of the conveyor casing, is provided beyond such bearing 15, with a pinion 17, which meshes with a gear 18 secured on the feeder shaft 6. The relative diameters of the pinion 17 and gear 18 provide for a preferred relative slow movement of the feeder with respect to the conveyor, though obviously the relative speeds of these elements may be selectively governed by proper relations of the pinion and gear.

Beyond the pinion 17 the shaft is provided with a free sleeve 19, on which is secured a power element 20, either as a gear, belt wheel, sprocket or like driver, through which power from any suitable source is imparted to the shaft 13. Beyond the power element 20, the sleeve 19 is provided with a clutch member 21, a cooperating clutch member 22 being keyed to the shaft 13 for sliding, non-rotary movement with respect thereto, and movable through a collar 23 in a conventional manner.

The open end of the conveyor casing 3 is designed to be closed by a cut-off 24, here shown in the form of a gate, swingingly supported at 25 at the upper portion of the conveyor casing and movable to permit the material to flow from the lower portion of the conveyor into the appropriate receiving element of the weighing machine (not shown). In order to prevent any possible flow or over-run of the cement following the interruption of the feeder movement and the closing of the gate 24, the latter is preferably provided with a sealing gasket 26 to engage a flanged terminal of the discharge end of the conveyor casing and insure an absolute sealing juncture between the gate and casing.

The gate 24 is moved to open position through the medium of an operator in the form of a curved bar 27, which is pivotally secured at 28 to the gate 24 and extends below and longitudinally of the conveyor casing 3. The terminal of the bar 27 is connected by a rod 29, preferably in two sections, interconnected by a turnbuckle 30, to the lower end of a lever 31, centrally formed as a yoke 32 to engage through the medium of a pin 33 with an annular channel in the collar 23, the upper end of the lever being pivotally supported at 34 on an appropriate part of the framing on which the apparatus is mounted.

A manually operable lever 35 is connected at its lower end to a transverse shaft 36, from which latter extends a crank arm 37, connected to the arm 27 through the medium of an elongated slot 38 in the crank arm and a pin 39 in the arm 27. The rod 29 is held in position to maintain the gate 24 closed through the medium of a spring 40, connected to said arm and adjustably connected through a threaded rod 41 and adjusting nut 42 to the framing.

Figure 2:
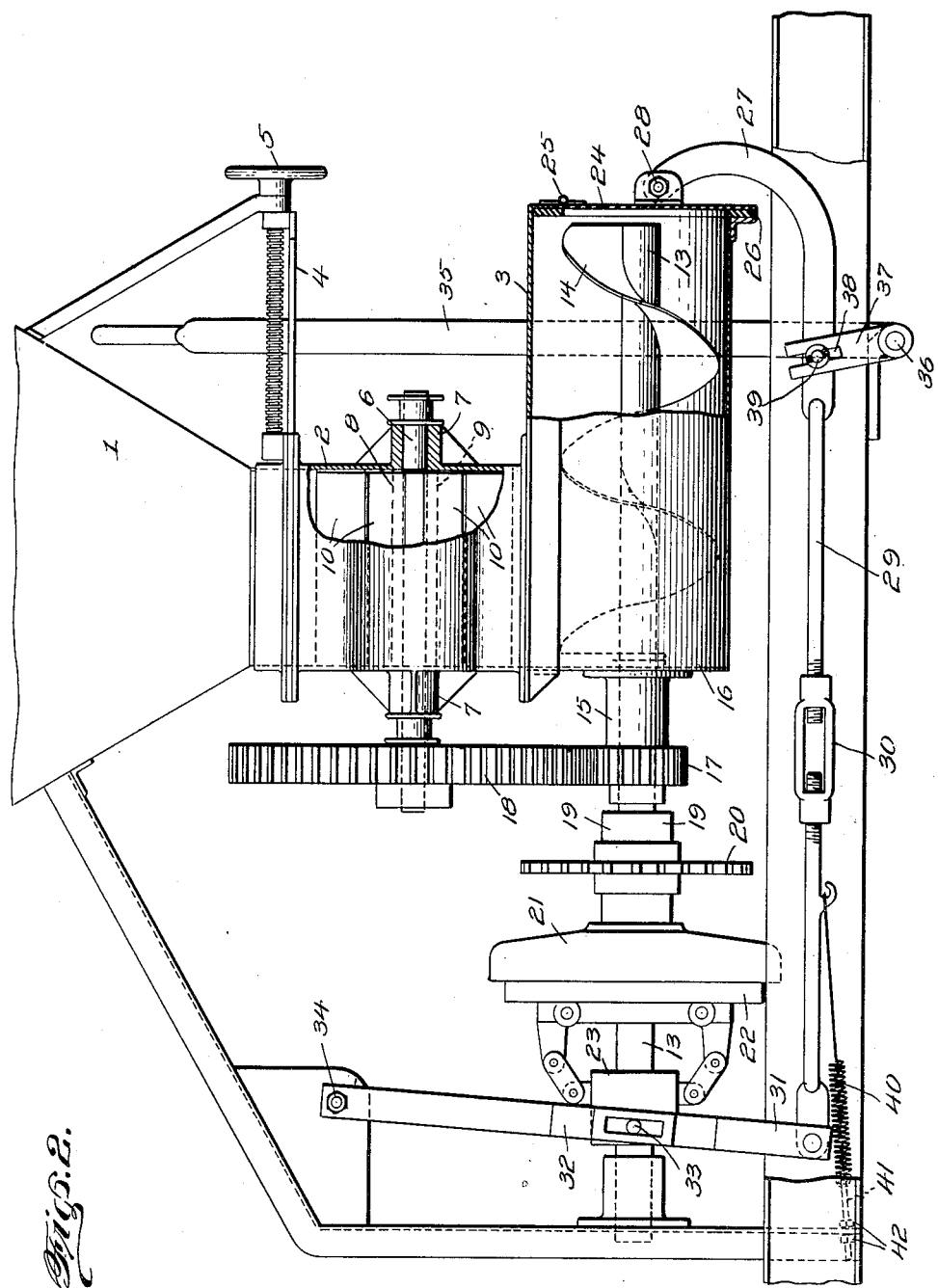
Fig. 2 is a side elevation, partly in section, of the same.

It is apparent from the above arrangement that the operation of the feeder 8, conveyor, 14, and cut-off 24 are simultaneously and similarly controlled in the operation of the hand lever 35, for when said lever is moved in a direction to open the gate 24, that is toward the right in Fig. 2, the clutch member 22 is brought into effective cooperation with the constantly operating clutch member 21. Thus movement is imparted to the shaft 13, tending to operate the conveyor, and, through the pinion 17 and gear 18, simultaneous operation of the feeder 8 will be compelled. As the cement in the hopper is delivered by the relatively slow moving feeder in what may be termed successive and somewhat measured masses of material, such masses are delivered to the conveyor, and by the conveyor forced through the open end of the conveyor casing into the weighing machine. When such weighing machine indicates the proper amount of material, the hand lever 35 is moved in the opposite direction, that is, toward the left in Fig. 2, whereupon the cut-off or gate 24 is immediately closed, and as the clutch lever 31 is moved in a direction opposite to that previously described, the clutch member 22 is disengaged from the clutch member 21, further movement of the shaft 13 is interrupted, and the conveyor and also the feeder are no longer in operation. Thus there is no delivery through the feeder to the conveyor, and hence no tendency for the material to accumulate in the conveyor for dribbling through the open end of the conveyor casing, and there is no possibility of the outflow of any further amount of cement, for the gate 24 absolutely seals the delivery end of the conveyor casing against any such tendency of the material.

The provision of the hand lever 35 is intended to indicate any conventional means for controlling the operation of the mechanism. As feeding devices of this character are otherwise conventionally controlled, the showing of the hand lever 35 is intended to indicate all such conventional controls, that is, for example, such controls may be automatic through electrical devices governed by the weighing machine, whereupon following a predetermined amount in such weighing machine, a circuit is closed to operate a magnetic clutch for the release of the power to the shaft 13. Again, a direct motor drive may be used, in which case the gate will be operated simultaneously through a combination of electric wiring by means of a solenoid or other electric apparatus.

These, as well as other conventional controls, are contemplated, as being indicated by the showing of the manual control through the hand lever 35.

The spring 40 assists the return of the mechanism to inoperative or cut-off position, and insures a positive closing of the gate when the opening power is released. Under any wear in parts, proper coaction may be readily maintained through the adjustment provided in the rod 29 by the hand operation of the turnbuckle 30.

While the device is designed primarily for the handling cement intermediate the source of bulk supply and the weighing machine, it is of course obvious that it is equally well adapted for the handling of cement when the latter is to be delivered in predetermined weight for bagging, or to be used for the handling of fine material, such as mineral dust fillers used in asphaltic mixtures, or in the handling of commercial limestone or other fine mineral dust for agricultural purposes, or for the handling of any type of finely divided substances, mineral, metal, or otherwise.

What is claimed as new, is:—

A material handling apparatus, comprising a horizontally disposed cylindrical casing, a shell disposed on top of the casing adjacent one end, a rotary feeder disposed in said shell and embodying a shaft and uniformly spaced radially disposed wings defining pockets, a spiral conveyor disposed in said casing in parallelism with the feeder, operative connections between the conveyor and the feeder to effect synchronous movement of the two, a hopper discharging into the shell above the feeder, the casing having a swingingly mounted gate closing an open end thereof and constituting a conveyor discharge, a member carried by the conveyor for connection to a motive mechanism, a clutch interposed between said member and conveyor, an arm having a terminal pivotal connection with said gate on its outer face, a pivotally mounted lever for actuating said clutch, a longitudinally adjustable rod connecting said lever and said arm, a shaft disposed transversely to said casing, a manual lever disposed at one side of said casing and connected to said shaft, a crank arm carried by said shaft, and a pin carried by said arm and having a running engagement with an elongated slot formed at the free end of said crank arm.

WILLIAM B. SLEMMER.